United States Patent [19]

Yamazaki et al.

[11] Patent Number: 4,782,264
[45] Date of Patent: Nov. 1, 1988

[54] COLOR PICTURE DEVICE INCLUDING CONVERGENCE CORRECTING MAGNETIC PLATES

[75] Inventors: Hidetoshi Yamazaki; Masatsugu Inoue, both of Fukaya, Japan

[73] Assignee: Kabushiki Kaisha Toshiba, Kawasaki, Japan

[21] Appl. No.: 28,029

[22] Filed: Mar. 18, 1987

Related U.S. Application Data

[63] Continuation of Ser. No. 753,995, Jul. 11, 1985, abandoned.

[30] Foreign Application Priority Data

Jul. 12, 1984 [JP] Japan .................... 59-143343

[51] Int. Cl.$^4$ .................... H01J 29/54; H01J 29/72
[52] U.S. Cl. .................... 313/413; 313/433; 313/440; 335/211
[58] Field of Search ............ 313/413, 426, 431, 433, 313/434, 435, 440; 335/210, 211, 212

[56] References Cited

U.S. PATENT DOCUMENTS

| | | | |
|---|---|---|---|
| 4,143,345 | 3/1979 | Barkow | 335/210 X |
| 4,246,560 | 1/1981 | Shimizu et al. | 335/212 |
| 4,386,331 | 5/1983 | Kohzuki et al. | 335/211 |
| 4,433,268 | 2/1984 | Arisato | 313/440 |

FOREIGN PATENT DOCUMENTS

| | | |
|---|---|---|
| 2034201 | 12/1970 | France . |
| 2036993 | 12/1970 | France . |
| 56-9950 | 1/1981 | Japan . |
| 57-210546 | 12/1982 | Japan . |
| 59-16250 | 1/1984 | Japan . |

*Primary Examiner*—David K. Moore
*Assistant Examiner*—K. Wieder
*Attorney, Agent, or Firm*—Cushman, Darby & Cushman

[57] ABSTRACT

In a color picture device having a tube envelope and an in-line type electron gun assembly disposed in a neck section of the tube envelope, a deflection unit includes a pair of first deflecting coils for deflecting three electron beams in a horizontal scanning direction coinciding with the in-line arranged direction, and a pair of second deflecting coils for deflecting the electron beams in a vertical scanning direction perpendicular to the horizontal scanning direction. A pair of permanent magnet plates is arranged individually between a funnel section and the second deflecting coils, and adapted to form a deflection magnetic field of a direction opposite to the vertical scanning direction.

5 Claims, 3 Drawing Sheets

COLOR PICTURE DEVICE INCLUDING CONVERGENCE CORRECTING MAGNETIC PLATES

This is a continuation of application Ser. No. 753,995, filed July 11, 1985, which was abandoned upon the filing hereof.

BACKGROUND OF THE INVENTION

The present invention relates to a color picture device, and, more particularly, to a color picture device provided with an electron gun assembly of an in-line type for emitting three electron beams, and a deflection unit for deflecting the electron beams in horizontal and vertical directions.

Generally, in a color picture device of an in-line type, three electron beams corresponding to three colors, red, green and blue, are emitted from an electron gun assembly housed in a neck section of a tube envelope, and are focused by an electron lens of the electron gun assembly so that a beam spot of an optimum size is formed on a panel section such as a phosphor screen of the tube envelope. These electron beams are deflected by a deflection magnetic field produced by a deflection unit which, disposed around the neck and funnel sections of the tube envelope, consists of a saddle-type coil, for producing a horizontal deflection magnetic field, and a toroidal-type coil which is toroidally wound around a ring-shaped magnetic core and adapted to produce a vertical deflection magnetic field. The screen is scanned by the deflected electron beams.

More specifically, in the electron gun assembly of the prior art color picture device, the longitudinal or horizontal direction of the phosphor screen is in alignment with the arrangement direction of the electron beams, and the center beam is coincided substantially with the tube axis of the tube envelope. Scanning regions for the electron beams are essentially rectangular, and the scanning region for the center beam needs to be aligned exactly on the phosphor screen with each of the scanning regions of the two side beams. Normally, the loci of the three electron beams extend parallel to and at equal distances from one another in the region from the cathodes of the electron gun assembly to the main lens section. The side beams are given a slight tilt toward the tube axis at the main lens section, so that the three electron beams are converged on the phosphor screen. Misconvergence, if any, between the three electron beams may be corrected by, for example, multipolar magnets. The multipolar magnets are used in, for example, a color picture device which is disclosed in Japanese Patent Publication No. 45936/1971. In this color picture device, the multipolar magnets are attached to the neck section of the tube envelope, wherein there is contained the electron gun assembly.

The horizontal deflection magnetic field formed by the deflection unit is in the shape of a pincushion, while the vertical deflection magnetic field formed by the deflection unit is barrel-shaped. The three electron beams are converged throughout the entire rectangular screen. In this case, the convergence between the side beams and the center beam is subject to coma aberration, since the side and center beams are different in deflection sensitivity due to the nonuniform magnetic field. In a color picture device stated in Japanese Patent Disclosure No. 7053/1982, coma aberration is corrected by the use of magnetic field control elements which are attached to the tip portions of electron guns. These magnetic field control elements cause the three electron beams to act effectively on the nonuniform deflection magnetic fields.

However, these magnetic field control elements are subject to the following drawbacks. Referring to FIG. 1 in which the phosphor screen is viewed through an outer side of the transparent panel section of the tube envelope, the phosphor screen is horizontally scanned from its left end with the three electron beams. In this horizontal scanning, the intensity of the horizontal deflection magnetic field is reduced to zero for the electron beams reaching the center of the screen. Since each of the magnetic field control elements have a certain hysteresis characteristic, a remanent magnetization exists on each of the control elements even though the horizontal deflection magnetic field is reduced to zero. The remanent magnetization produces a magnetic field so that the center and side beams are slightly deflected even in the center of the screen. The magnetic field produced by the remanent magnetization serves to deflect the three electron beams to the right on the screen. The magnetic field acts on each side beam with higher intensity than on the center beam. In this case, even when the three electron beams are converged on the center of the screen without being deflected, the relative positions of the center beam and the side beams are deviated in the center of the screen during deflection scanning. Namely, in the center of the screen, the position of the center beam 4A is deviated from the position of each side beam 6A toward the horizontal scanning start side of the screen 2, as shown in FIG. 1.

In the vicinity of the short side of the screen, conversely, the three electron beams are converged by the magnetic field control elements, for forming the nonuniform magnetic field, to correct the coma aberration. This effect may be obtained because the magnetic field control elements are generally formed of material with high permeability, such as permalloy which has a low magnetic coercive force, so that the magnetic field control elements are fully saturated with magnetization produced by the deflection magnetic field. Thus, owing to remanent magnetization on each of the magnetic field control elements, that is, on account of their hysteresis characteristic, the three electron beams undergo no misconvergence in the vicinity of the short side of the screen 2, while misconvergence is caused between the center beam 4A and the two side beams 6A in the center of the screen 2. Accordingly, the multipolar magnets are adjusted so that the three electron beams converge on the center of the screen 2. This adjustment causes misconvergence in the vicinity of the short side of the screen 2, as shown in FIG. 2. Such misconvergence cannot be corrected by the magnetic field of the deflection unit. Also, in an ordinary color picture device, the size of said misconvergence ranges from 0.1 to 0.3 mm. Therefore, the picture quality, in terms of either color purity or convergence, is quite inferior. This is an important problem for a color picture device in which a high resolution is necessary.

The misconvergence between the center beam 4B' or 4C' and the side beams 6B' or 6C' in the vicinity of the short side of the screen 2 is, as shown in FIG. 2, caused by more than just the magnetic field control elements. For example, such misconvergence may also be caused by a pair of high permeability metal plates which are usually provided within the vertical deflecting coils in the neck section for the purpose of making the vertical deflection magnetic field a high-intensity barrel-shaped magnetic field. During deflection scanning, the direction, in the center of the screen, of a magnetic field produced by the high permeability metal plates is opposite to that of the remanent magnetic field produced by the magnetic field control elements. Specifically, the center and side beams are slightly deflected toward the horizontal scanning start side of the screen 2 by the magnetic field produced by the high permeability metal plates. During deflection scanning, the magnetic action on the center beam is higher in intensity than that on the side beams. In the center of the screen 2, therefore, the position of the center beam 4A is deviated from the position of each side beam 6A toward the horizontal scanning start side of the screen 2, as shown in FIG. 1. In the vicinity of the short side of the screen 2, in contrast, the three electron beams are converged by the magnetic field control elements which form the nonuniform magnetic field to correct coma aberration. In this case, the picture pattern is similar to the one caused by the magnetic field control elements, as mentioned above. This picture pattern is corrected by the multipolar magnets, so that misconvergence is caused between the center beam 4B' or 4C' and the side beams 6B' or 6C' in the vicinity of the short side of the screen 2.

SUMMARY OF THE INVENTION

The object of the present invention is to provide a color picture device in which higher picture quality is obtained by correcting misconvergence between the center beam and side beams.

According to the present invention, there is provided a color picture device which comprises a tube envelope having a tube axis, including a neck section, a panel section, and a funnel section formed between the neck section and the panel section. The color picture device further comprises an in-line type electron gun assembly disposed in the neck section, and a deflection unit disposed around the neck section and the funnel section. The electron gun assembly includes three electron gun sections emitting three electron beams, including a center beam and two side beams, toward the panel section. The three electron gun sections are arranged in an in-line arranged direction perpendicular to the tube axis. The deflection unit includes a pair of first deflecting coils for deflecting the three electron beams in a horizontal scanning direction coinciding with the in-line arranged direction, and a pair of second deflecting coils for deflecting the electron beams in a vertical scanning direction perpendicular to the horizontal scanning direction. The color picture device further comprises a pair of magnetic field forming means arranged individually between the funnel section and the second deflecting coils, and adapted to form a deflection magnetic field directed opposite to the vertical scanning direction.

The magnetic field forming means serve to correct undesired magnetic fields, thereby eliminating misconvergence between the center beam and the side beams in the center of the screen. In eliminating the misconvergence, the magnetic field forming means never exerts any deleterious influence on the peripheral portion of the screen. Thus, the electron beams can be improved in convergence characteristic throughout the screen for higher picture quality.

BRIEF DESCRIPTION OF THE DRAWINGS

FIGS. 3 to 7 show a color picture tube of one embodiment, according to the present invention, in which FIG. 3 is a schematic sectional view in which an outline of the color picture device is indicated by an imaginary line, and a deflection unit of the color picture device is shown in section along a plane containing the tube axis and perpendicular to the in-line arrangement direction of an electron gun assembly, FIG. 4 is a schematic sectional view of the deflection unit in the position indicated by arrow IV in FIG. 3, FIGS. 5 and 6 are schematic views for illustrating magnetic fields in the neck section of an envelope tube produced by high permeability metal plates and permanent magnet plates shown in FIG. 4, and FIG. 7 is a schematic sectional view of magnetic field control elements in the position indicated by arrow VII in FIG. 3.

DETAILED DESCRIPTION OF THE PREFERRED EMBODIMENT

Referring now to FIGS. 3 to 7, an in-line color picture device of one embodiment according to the present invention will be described in detail.

Figure 1:
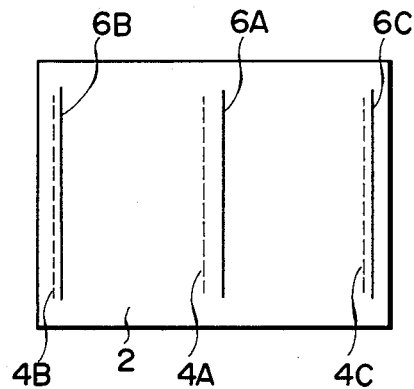
FIGS. 1 and 2 are schematic plan views of the screen of a prior art color picture tube for illustrating misconvergence between a center beam and side beams.
Figure 2:
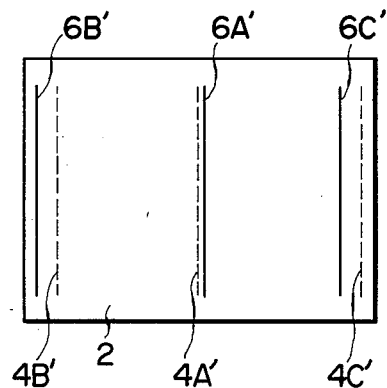
Figure 3:
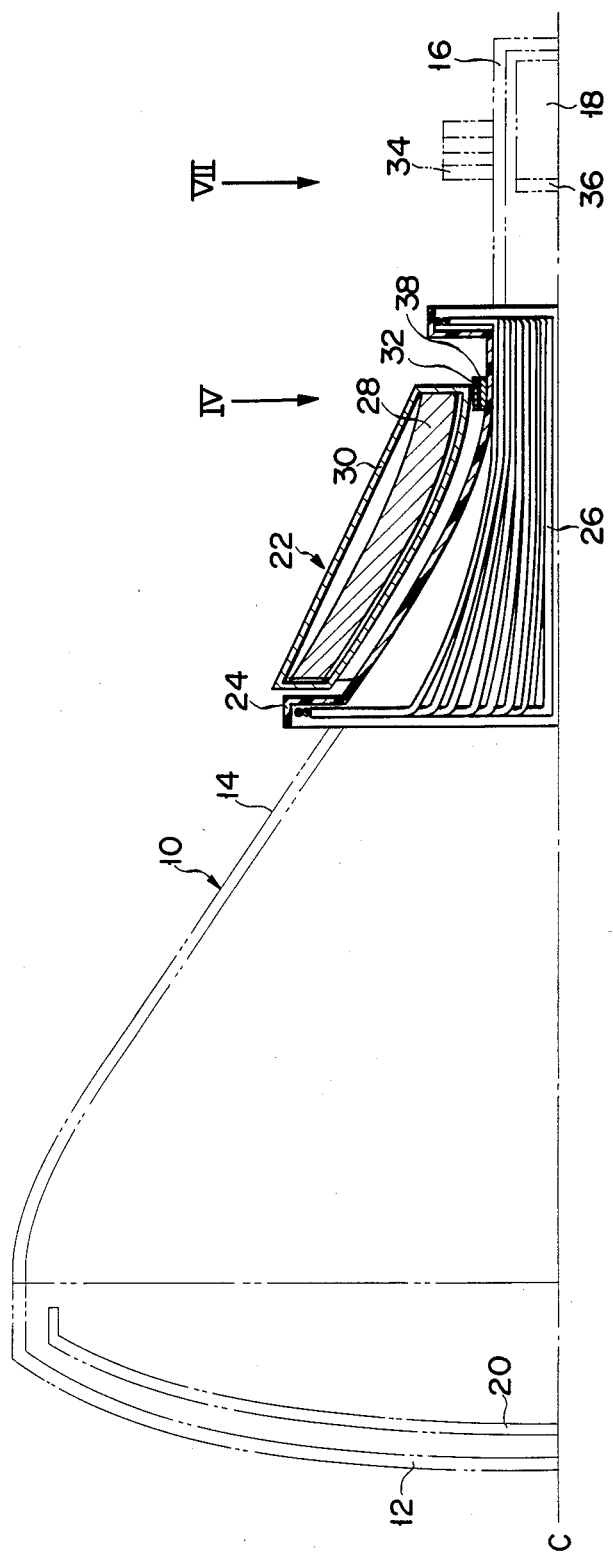

In FIG. 3, an outline of the color picture device is indicated by an imaginary line, and a deflection unit of the color picture device is shown in vertical section. The direction of extension of a beam plane (mentioned later) in this in-line color picture device and the direction perpendicular to the beam plane will hereinafter be referred to as horizontal and vertical directions, respectively. As is generally known, a tube envelope 10 of the color picture device has a tube axis C and is made of glass. The tube envelope 10 includes a panel section 12, a funnel section 14 and a neck section 16. A picture plane, as a rectangular screen, is formed on the inner surface of the panel section 12. The panel section 12 is integrally joined with the neck section 16 by means of the funnel section 14. The inside of the tube envelope 10 is kept at a high vacuum level. The neck section 16 contains therein an electron gun assembly 18 (indicated by an imaginary line in FIG. 3) which includes three electron gun sections corresponding to the three primary colors, i.e., red (R), green (G), and blue (B). These electron gun sections are arranged in in-line in a plane including the tube axis C. This plane, being defined by the in-line arrangement of the electron gun sections, is mentioned hereinafter as the beam plane.

Each of the electron gun sections has a heater, a control electrode and a main electron lens (not shown). Each electron beam emitted from a cathode to reach the screen is regulated in dose by the control electrode, and is focused to form a beam spot of an optimum size by the main electron lens. A shadow mask 20 having a number of regularly arranged fine apertures is disposed at a predetermined distance apart from the inner surface of the panel section 12. The inner surface of the panel section 12 is formed with red, green and blue phosphor stripes (not shown) corresponding to the fine apertures of the shadow mask 20, thus defining the screen. The three electron beams emitted from the electron gun assembly 18 are landed on their corresponding phosphor stripes, selected as landing regions by the shadow mask 20, so that the specified phosphor stripes are excited to glow.

The neck section 16 and the funnel section 14 of the tube envelope 10 are partially surrounded by the deflection unit 22. Said deflection unit 22 consists of a pair of saddle-type horizontal deflecting coils 26 attached to a plastic mold 24, and toroidal vertical deflecting coils 30 which are toroidally wound around a ring-shaped magnetic core 28 and adapted to produce a vertical deflection magnetic field. The horizontal deflection magnetic field produced by the horizontal deflecting coils 26 is in the shape of a pincushion, while the vertical deflection magnetic field produced by the vertical deflecting coils 30 is barrel-shaped. The electron beams are deflected by such a deflection field, so that the phosphor screen is scanned in the horizontal and vertical scanning directions, the horizontal scanning direction being the direction in which the electron beams travel from the left to the right on the phosphor screen when the phosphor screen is viewed through an outer side of the panel section of the tube envelope, and the vertical scanning direction being the direction in which the electron beams travel downwardly on the screen.

Figure 4:
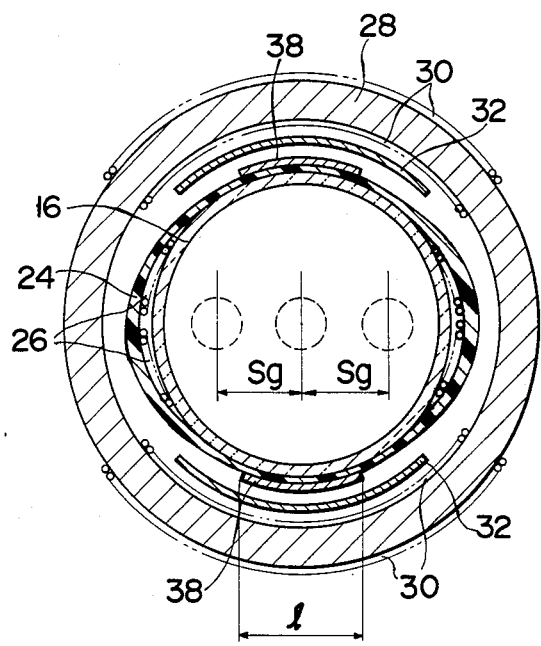

A pair of high permeability metal plates 32 are attached to the inside of the pair of vertical deflecting coils 30 on the side of the neck section 16 of the tube envelope 10, whereby the vertical deflection magnetic field becomes a high-intensity barrel-shaped magnetic field. As shown in FIG. 4, both of the ends of both of the high permeability metal plates 32 extend between the vertical and horizontal deflecting coils 30 and 26 in the circumferential direction of the neck portion. During deflection scanning, the remanent magnetization of the high permeability metal plates 32 produce a magnetic field which serves to deflect the three electron beams toward the horizontal scanning start side of the screen, as indicated by arrows in FIG. 5. In this magnetic field, the magnetic action on the center beam is greater than that on the two side beams.

Figure 7:
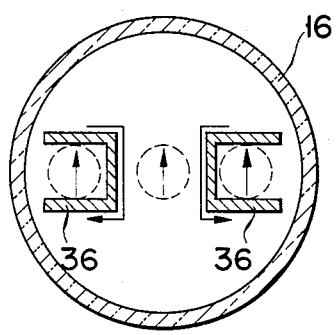

Referring again to FIG. 3, ring-shaped purity convergence magnets 34 are provided around the neck section 16 in which the electron gun assembly 18 is disposed. The purity convergence magnets 34 serve to correct misconvergence between the side beams and the center beam in the three electron beams. Magnetic field control elements 36 are attached to the end portions of the electron gun sections in the neck section 16. The magnetic field control elements 36 are formed of material with high permeability, such as permalloy. As shown in FIG. 7, the control elements 36 have a shape such that they substantially surround their corresponding side beams in cross section along a plane perpendicular to the tube axis. During deflection scanning, remanent magnetizations on the magnetic field control elements 36 produces a magnetic field which serves to deflect the three electron beams to the right on the screen, as indicated by arrows in FIG. 7. The direction of the magnetic field formed by the magnetic field control elements 36 is opposite to that of the magnetic field produced by the high permeability metal plates 32. In the magnetic field formed by the control elements 36, the magnetic action on the side beams is higher in intensity than that on the center beam.

Figure 6:
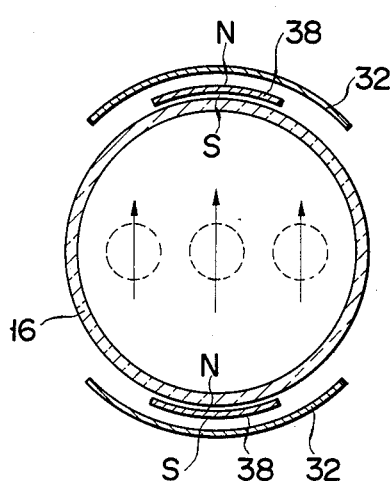

As shown in FIGS. 3 and 4, the present invention is characterized in that a pair of permanent magnet plates 38 which are arranged inside the vertical deflecting coils 32 and located on the side of the neck section 16 along the tube axis. Each of the permanent magnet plates 38 is magnetized in the direction of its thickness. As shown in FIG. 6, the upper permanent magnet plate 38 is magnetized so that its tube axis side portion and its vertical deflecting coil side portion serve as south and north poles, respectively. Conversely, the lower permanent magnet plate 38 is magnetized so that its tube axis side portion and its vertical deflecting coil side portion serve as north and south poles, respectively. Therefore, a magnetic field produced by the permanent magnet plates 38 is directed upward, as indicated by arrows in FIG. 6. In the magnetic field formed by the permanent magnet plates 38, the magnetic action on the center beam is higher in intensity than that on the side beams.

As shown in FIG. 4, the horizontal width of each permanent magnet plate 38 is equal to or preferably shorter than twice the distance between the center of an aperture for the center beam and the center of an aperture for each side beam in the electron gun assembly 18. Specifically, if the horizontal width of each permanent magnet plate 38 and the interval between the center of the center beam and the center of each side beam in the electron gun assembly 18 are l and Sg, respectively, there is a relationship as follows:

$$l \leq 2Sg.$$

The effect of the color picture device according to the present invention and as attributed to the arrangement of the pair of permanent magnet plates 38 inside the deflecting unit 22, will now be described in detail.

Figure 5:
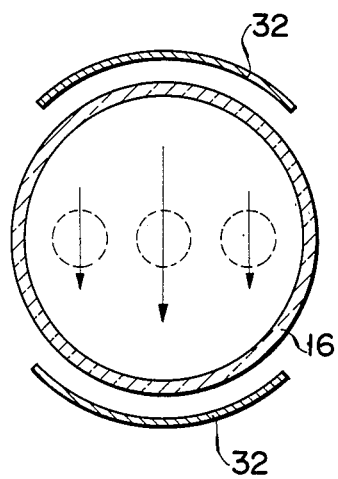

The magnetic field produced by the permanent magnet plates 38 can cancel the magnetic field produced by the remanent magnetization of the high permeability metal plates 32. If the horizontal width of each permanent magnet plate 38 is equal to or preferably shorter than twice the distance between the center of the center beam emission aperture and the side beam emission aperture, the intensity of the magnetic field acting on the center beam can be increased more than the magnetic field intensity affecting each side beam. As shown in FIG. 5, therefore, the magnetic field produced by the high permeability metal plates 32 acts on the center beam with higher intensity than on each side beam. The permanent magnet plates 38 can effectively cancel such an effect of the magnetic field produced by the high permeability metal plates 32.

In the magnetic field produced by the remanent magnetizations of the magnetic field control elements 36, the magnetic field intensity acting on the center beam is lower than that on the side beams. This magnetic field can be effectively corrected for uniform intensity.

Deflection of the three electron beams by the permanent magnet plates 38 will now be described in detail. During the deflection scanning, vertical deflection magnetic field is hardly influenced on account of the direction of the magnetic field of the permanent magnet plates 38, while the horizontal deflection magnetic field is affected uniformly throughout the screen. Accordingly, if the electron beams are converged on the center of the screen by adjusting the correcting magnets 34, they are converged throughout the entire picture plane. Thus, the permanent magnet plates 32 will never exert any adverse influence on the picture quality.

The following are specific figures for an example to which the present invention is applied.

If the outside diameter of the neck and the deflection angle of a color picture device with a 14-inch type screen are 22.5 mm and 90 degrees, respectively, the size of misconvergence between the center beam and the each side beam is about 0.1 mm. Such misconvergence may be corrected with use of permanent magnet plates formed of barium ferrite, and measuring 5 mm in horizontal width and 4 mm in width in the direction of the tube axis.

What is claimed is:

1. A color cathode ray tube device comprising:
a tube envelope having a tube axis, said tube envelope including a neck section, a panel section and a funnel section formed between the neck section and the panel section;
an in-line type electron gun assembly disposed in the neck section and including three electron gun sections for emitting a center electron beam and two side electron beams toward the panel section, the three electron gun sections being arranged along a line perpendicular to the tube axis;
a deflection unit disposed around the neck section and the funnel section, said deflection unit including a pair of first deflecting coils for deflecting the electron beams in a horizontal scanning direction coinciding with the direction of the line of said three electron gun sections, and a pair of second deflecting coils for deflecting the electron beams in a vertical scanning direction perpendiculr to the horizontal scanning direction;
a pair of high permeability metal plates with extend between the vertical and horizontal deflection coils; and
a pair of permanent magnet plates having opposed surfaces facing each other, each magnet plate being disposed between the neck section and the corresponding high permeability metal plate, the opposite surfaces of the permanent magnet plates having different magnetic polarities to form a magnetic field in a region of the color cathode ray tube through which said electron beams pass and directed opposite to the vertical scanning direction for cancelling remanent magnetization of said high permeability plates, said permanent magnet plates being arranged so that the magnetic field intensity acting on the center beam is higher than that acting on the side beams.

2. A color cathode ray tube according to claim 1, wherein, when l is the width of each said permanent magnet parallel to said in-line arranged direction, and Sg is the interval between the center beam and each side beam, the relationship of the width l and the interval Sg is satisfied with the following expression, $$l \leq 2Sg.$$

3. A color cathode ray tube device comprising:
a tube envelope having tube axis, said tube envelope including a neck section, a panel section and a funnel section formed between the neck section and the panel section;
an in-line type electron gun assembly disposed in the neck section and including three electron gun sections being arranged along a line perpendicular to the tube axis;
a deflection unit disposed around the neck section and the funnel section, said deflection unit including a pair of first deflecting coils for deflecting the electron beams in a horizontal scanning direction coinciding with the direction of the line of said three electron gun sections, a pair of a second deflecting coils for deflecting the electron beams in a vertical scanning direction perpendicular to the horizontal scanning direction;
a pair of high permeability metal plates which extend between the vertical and horizontal deflection coils; and
a pair of permanent magnet plates having opposed surfaces faced to each other, each magnet plate being disposed between the neck section and the corresponding deflecting coil, the opposite surfaces of the permanent magnet plates having different magnetic polarities to form a magnetic field in a region of the color cathode ray tube through which said electron beams pass and directed opposite to the vertical scanning, thereby cancelling the remanent magnetization of said high permeability plates.

4. A color picture device according to claim 3, wherein said pair of permanent magnet plates are arranged so that the magnetic field intensity acting the center beam is higher than that acting on the side beams.

5. A color picture device according to claim 4, wherein, when Sg is the width of each said permanent magnet parallel to said in-line arranged direction, and Sg is the interval between the center beam and each side beam, the relationship of the width l and the interval Sg is satisfied with the expression $l \leq 22Sg$.

* * * * *